United States Patent
Hickson

(10) Patent No.: US 8,606,833 B2
(45) Date of Patent: Dec. 10, 2013

(54) METHOD AND SYSTEM OF COMMITTING OPERATIONS OF A SYNCHRONIZED TRANSACTION

(75) Inventor: Andrew Ian Hickson, West Wellow (GB)

(73) Assignee: International Business Machines Corporation, Armonk, NY (US)

( * ) Notice: Subject to any disclaimer, the term of this patent is extended or adjusted under 35 U.S.C. 154(b) by 1830 days.

(21) Appl. No.: 11/295,974

(22) Filed: Dec. 7, 2005

(65) Prior Publication Data

US 2006/0123070 A1 Jun. 8, 2006

(30) Foreign Application Priority Data

Dec. 8, 2004 (GB) .................................. 0426847.0

(51) Int. Cl.
*G06F 17/30* (2006.01)
(52) U.S. Cl.
USPC .......................................................... 707/826
(58) Field of Classification Search
USPC ........................... 707/100, 200, 826; 718/100
See application file for complete search history.

(56) References Cited

U.S. PATENT DOCUMENTS

| 5,465,328 | A | * | 11/1995 | Dievendorff et al. |
| 5,950,212 | A | * | 9/1999 | Anderson et al. |
| 6,012,094 | A | * | 1/2000 | Leymann et al. ............. 709/230 |
| 6,247,038 | B1 | * | 6/2001 | Banks et al. ................... 718/100 |
| 2002/0099973 | A1 | * | 7/2002 | Moser et al. ..................... 714/11 |
| 2003/0115276 | A1 | | 6/2003 | Flaherty et al. ............... 709/206 |
| 2005/0054445 | A1 | * | 3/2005 | Gatto et al. |

\* cited by examiner

*Primary Examiner* — Amresh Singh
(74) *Attorney, Agent, or Firm* — Steven M. Greenberg, Esq.; Carey, Rodriguez, Greenberg & O'Keefe

(57) ABSTRACT

A method and system for combined commit transaction request and subsequent operation request for committing the operations of a synchronized transaction by one or more applications (301, 4001, 501) on a resource manager (302, 402, 502). The method comprises: receiving a combined request (310, 410, 510) for an operation and a request to commit any outstanding synchronized transaction; committing the outstanding transaction (311, 414, 512); and processing (313, 413, 517) the requested operation outside the outstanding transaction. For example, in an asynchronous messaging process, the combined request specifies an option in a get operation request to commit any outstanding units of work prior to carrying out the get operation.

8 Claims, 5 Drawing Sheets

METHOD AND SYSTEM OF COMMITTING OPERATIONS OF A SYNCHRONIZED TRANSACTION

BACKGROUND OF THE INVENTION

This invention relates to the field of maintaining data integrity. In particular, this invention relates to combining a commit command for a transaction with a subsequent operation instruction in an asynchronous messaging system.

Synchronization of transactions is required to maintain data integrity. For example, a sale transaction comprises the subtraction of money from a customer's account and its addition to the retailer's account. The two halves of the transaction must both occur in order to maintain the data integrity. If the subtraction from the customer's account takes place but an error occurs and the addition to the retailer's account does not take place the whole transaction must be backed out. Therefore, the transaction is only confirmed or committed once all parts of the transaction have been completed.

This concept has wide reaching applications across data systems. Data resources which require synchronization may be distributed with interconnection via network communications or may be local to a single computer system. A transaction coordinator can synchronize related changes to multiple data resources: either all related changes occur, or they are all undone.

In messaging systems, changes to a message queue resource are treated in the same way as changes to other data resources such as databases. This invention is described in terms of messaging systems; however, it can be applied to other systems with distributed resources which require transaction coordination.

In a messaging system, the decision to commit or back out the changes is taken, in the simplest case, at the end of a transaction. However, it can be more useful for an application to synchronize data changes at other logical points within a transaction. These logical points are called syncpoints (or synchronization points) and the period of processing a set of updates between two syncpoints is called a unit of work. Multiple messaging get and put operations can be part of a single unit of work.

When an application puts a message on a queue within a unit of work, that message is made visible to other applications only when the application commits the unit of work. To commit a unit of work, all updates must be successful to preserve data integrity. If the application detects an error and decides that the put operation should not be made permanent, it can back out the unit of work. When an application performs a back out, the system restores the queue by removing the messages that were put on the queue by that unit of work. The way in which the application performs the commit and back out operations depends on the environment in which the application is running.

Similarly, when an application gets a message from a queue within a unit of work, that message typically remains on the queue until the application commits the unit of work, but the message is marked as not available to be retrieved by other applications. The message is permanently deleted from the queue when the application commits the unit of work. If the application backs out the unit of work, the system restores the queue by making the messages available to be retrieved by other application.

Java Database Connectivity (JDBC a trade mark of Sun Microsystems, Inc.) includes an auto-commit mode in which an individual statement is treated as a transaction and is automatically committed after it is executed.

The prior art processes commit a set of operations after the last operation has been executed. An aim of the present invention is to provide an option when requesting an operation to commit any outstanding work prior to processing the operation.

SUMMARY OF THE INVENTION

According to a first aspect of the present invention there is provided a method of committing the operations of a synchronized transaction by one or more applications on a resource manager, comprising: receiving a combined request for an operation and a request to commit any outstanding synchronized transaction; committing the outstanding transaction; and processing the requested operation outside the outstanding transaction.

The requested operation may be processed in a new transaction or as a stand-alone operation. If the step of committing is not successful, the requested operation may not be processed.

The step of committing may transfer the synchronized transaction to await committing with other transactions. The request to commit may indicate a transaction boundary to the resource manager and may transfer the responsibility of when to commit the transaction to the resource manager. The resource manager may commit the transaction based on the size of the transaction or on the availability of the means to process the requested operation. The resource manager may commit the transaction based on the number of applications with outstanding transactions in progress.

Preferably, the method is part of an asynchronous messaging process. The requested operation may be a get operation, the synchronized transaction may be a unit of work and the resource manager may be a queue manager. The combined request may specify an option in a get operation request to commit any outstanding units of work. The option may also indicate the transfer of responsibility of when to commit to the queue manager.

According to a second aspect of the present invention there is provided a system for committing the operations of a synchronized transaction by one or more applications on a resource manager, the resource manager comprising: means for receiving a combined request for an operation and a request to commit any outstanding synchronized transaction; means for committing the outstanding transaction; and means for processing the requested operation outside the outstanding transaction.

The means for committing may transfer the synchronized transaction to await committing with other transactions. The combined request may indicate a transaction boundary to the resource manager and may transfer the responsibility of when to commit the transaction from an application to the resource manager. The means for committing may determine whether to commit the transaction based on the size of the transaction or on the availability of the means for processing the requested operation. The means for committing may determine when to commit the transaction based on the number of applications with outstanding transactions in process.

Preferably, the system is an asynchronous messaging system. The requested operation may be a get operation, the synchronized transaction may be a unit of work and the resource manager may be a queue manager. The combined request may specify an option in a get operation request to commit any outstanding units of work. The option may indicate the transfer of responsibility of when to commit to the queue manager.

According to a third aspect of the present invention there is provided computer program product stored on a computer readable storage medium, comprising computer readable program code means for performing the steps of: receiving a combined request for an operation and a request to commit any outstanding synchronized transaction; committing the outstanding transaction; and processing the requested operation outside the outstanding transaction.

BRIEF DESCRIPTION OF THE DRAWINGS

Embodiments of the present invention will now be described, by way of examples only, with reference to the accompanying drawings in which.

DESCRIPTION OF THE PREFERRED EMBODIMENTS

Figure 1:
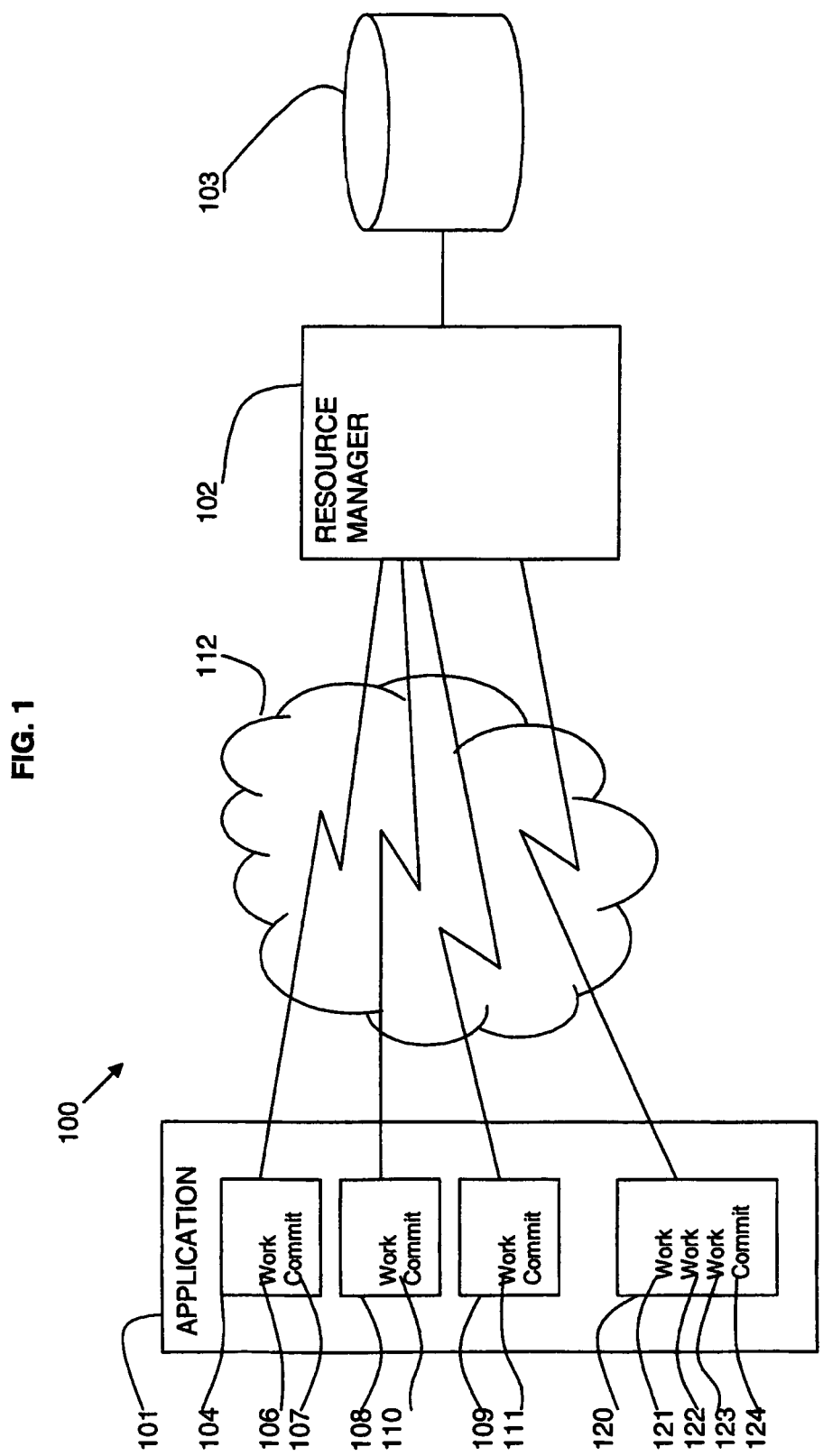
FIG. 1 is a block diagram of a computer system with a distributed client and resource manager to which the present invention may be applied.

Referring to FIG. 1, a data processing system 100 is shown with a client application 101 and a resource manager 102. In the illustrated embodiment, the client application 101 is connected by a network communication means 112 to the resource manager 102. The resource manager 102 has a storage means 103, for example, a disk storage system. The application 101 sends operation commands in the form of API calls to carry out operations on the resources of the resource manager 102.

A transaction for which data integrity must be maintained may comprise one or more operation commands by the application 101. The transaction boundaries are frequently started implicitly by requesting that an operation is performed within a unit of work; however, an explicit verb is usually used to end the transaction, commit the updates and receive the transaction outcome.

In FIG. 1, the application 101 may carry out a transaction 104 requesting the resource manager 102 carries out some work 106, and then commits 107 the changes caused by the work 106. This may be repeated in multiple transactions 108, 109 for each atomic item of work 110, 111.

The resource manager 102 writes the changes to the storage means 103. The resource manager 102 does not usually write individual changes to the storage means 103 after each unit of work, but bundles a group of changes together and writes the group in one write operation. The resource manager 102 may bundle together changes caused by units of work carried out by a plurality of applications (such as the application 101 shown in FIG. 1). The applications 101 are unaware of how the resource manager 102 groups together and writes the changes.

The application 101 may be far removed from the resource manager 102 and there may be a delay due to network communications in the application 101 receiving confirmation that work has been completed. To avoid the number of API calls required between an application 101 and the resource manager 102, operations may be batched by the application 100 to reduce the number of network flows required. A transaction 120 is shown in FIG. 1 in which three work operations 121, 122, 123 which are each atomic items of work are grouped together before an explicit commit 124 operation is issued. Only at the commit command 124 does the resource manager 102 write the batched work to the storage means 103.

The embodiments described herein are given in the context of a messaging environment, specifically WebSphere MQ messaging (formerly known as MQSeries. WebSphere and MQSeries are trade marks of International Business Machines Corporation). Details of WebSphere MQ messaging are provided at http://www.ibm.com/software/integration/wmq. The invention could equally be applied to other applications and environments in which data integrity is preserved by means of an explicit commit transaction command.

Messaging and queuing enables applications to communicate without having a private connection to link them. Applications communicate by putting messages on message queues and by taking messages from message queues. A resource manager is provided in the form of a queue manager in which queues reside and are managed. The communicating applications may be running on distributed computer systems. There are many messaging system architectures and the type of architecture is not relevant to the invention.

Figure 2:
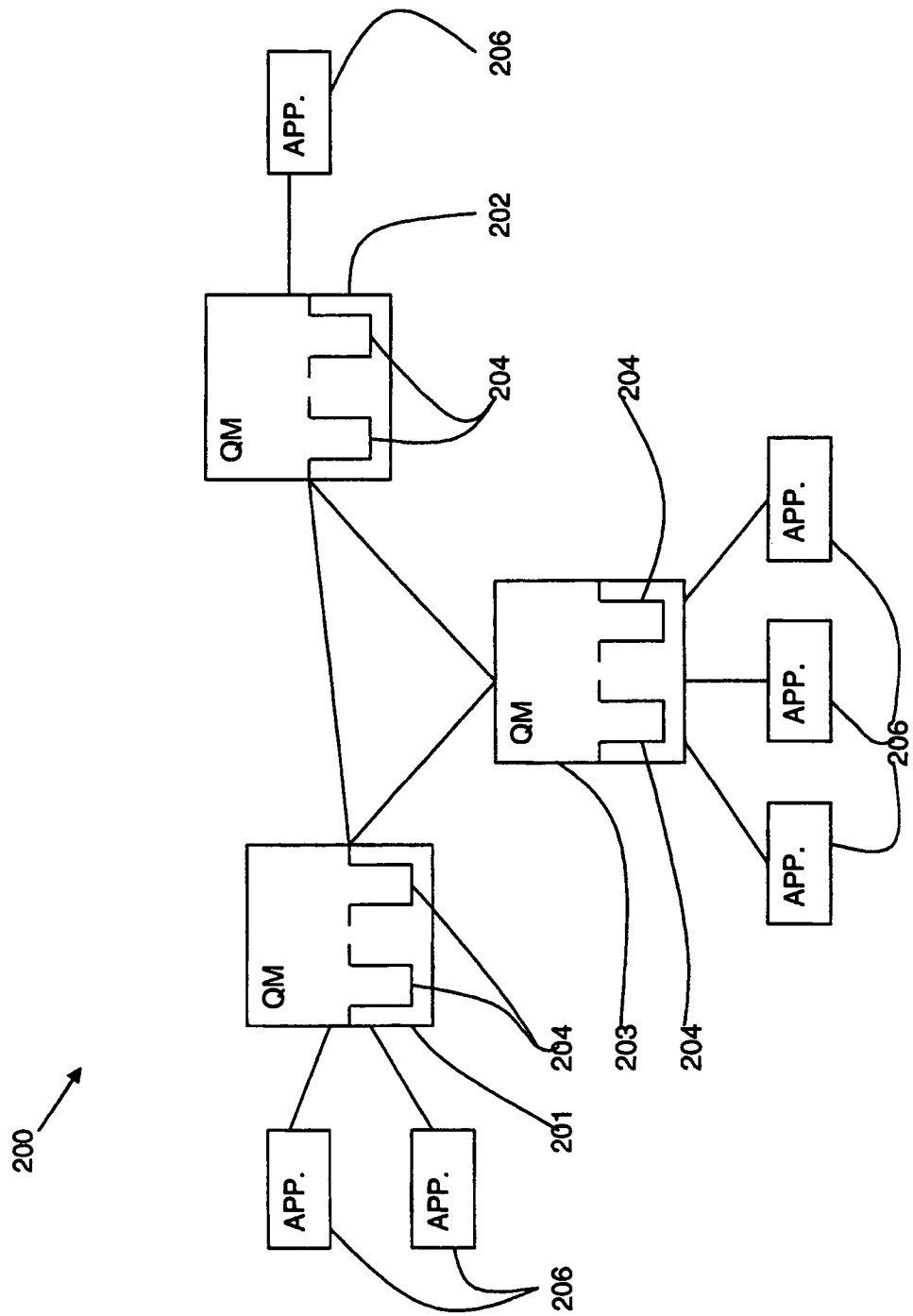
FIG. 2 is a block diagram of a messaging system with multiple queue managers to which the present invention may be applied.

FIG. 2 is a generalised representation of a messaging system 200 with a plurality of connected queue managers 201, 202, 203. Each queue manager 201, 202, 203 has resources in the form of queues 204. Applications 206 are connected to one of the queue managers 201, 202, 203 and send and receive messages to that queue manager. There need not be any direct connection between applications that communicate using message queues. An application sends messages to a queue owned by a queue manager and another application retrieves messages from a queue.

A transaction coordinator (also referred to in messaging systems as a syncpoint manager) is provided for synchronizing transactions across the queues 204. The queue managers 201, 202, 203 defer commitment of changes made to queues until all the parties to a transaction can commit.

A local unit of work is one in which the only resources updated are those of the connected queue manager. In this case, syncpoint coordination is provided by the queue manager itself using a single-phase commit procedure.

A global unit of work is one in which resources belonging to other resource managers, such as databases, are also updated. The transaction coordination may be the queue manager or may be provided externally to the queue manager.

An application talks directly to a connected queue manager using an interface. The described embodiments use the Message Queue Interface (MQI) as an example; however, corresponding commands are provided in other messaging systems and in other transaction based systems. The MQI is a set of calls that applications use to ask for the services of a queue manager.

The calls in the MQI can be grouped as follows:

MQCONN, MQCONNX, and MQDISC—These calls are used to connect an application to, and disconnect an application from, a queue manager. The MQCONNX call is similar to the MQCONN call, but includes options to control the way that the call actually works.

MQOPEN and MQCLOSE—These calls are used to open and close an object, such as a queue.

MQPUT and MQPUT1—These calls are used to put a message on a queue.

MQGET—This call is used to browse messages on a queue, or to remove messages from a queue.

Options are provided to control the action of a get operation. One of the options which may be specified with a get operation is an option to wait for messages to arrive on the queue. A maximum time the application waits is specified as a wait interval.

Another form of option relates to the participation of the get operation within a unit of work. A get operation can be specified with syncpoint control in which case the get request operates within the normal unit of work protocols. A message is marked as being unavailable to other applications, but it is deleted from the queue only when the unit of work is committed. The message is made available again if the unit of work is backed out.

MQINQ—This call is used to inquire about the attributes of an object.

MQSET—This call is used to set some of the attributes of an object.

MQBEGIN, MQCMIT, and MQBACK—These calls are used when coordinating a unit of work. MQBEGIN starts the global unit of work. MQCMIT and MQBACK end the unit of work, either committing or rolling back the updates made during the unit of work.

The form of messaging may vary with different systems including point to point messaging and publish/subscribe systems.

The described method provides an option on an operation request requesting that any outstanding transaction should be committed prior to processing the operation request. If the commit succeeds, then the operation request is carried out, optionally within a new transaction.

For example, the operation request is a get request and any outstanding unit of work is committed before the get operation is carried out. The combined commit request is provided as an option on a get request, for example, MQGMO_COMMIT.

In a client/server system, the client application may issue a looping sequence to get, operate, put and commit a unit of work. This may consist of a repeating sequence of {MQGET; MQPUT; MQCMIT}. Using the described option of combined commit and operation request, a client application can issue a repeating sequence of {MQGET+MQGMO_COMMIT; MQPUT}.

Figure 3:
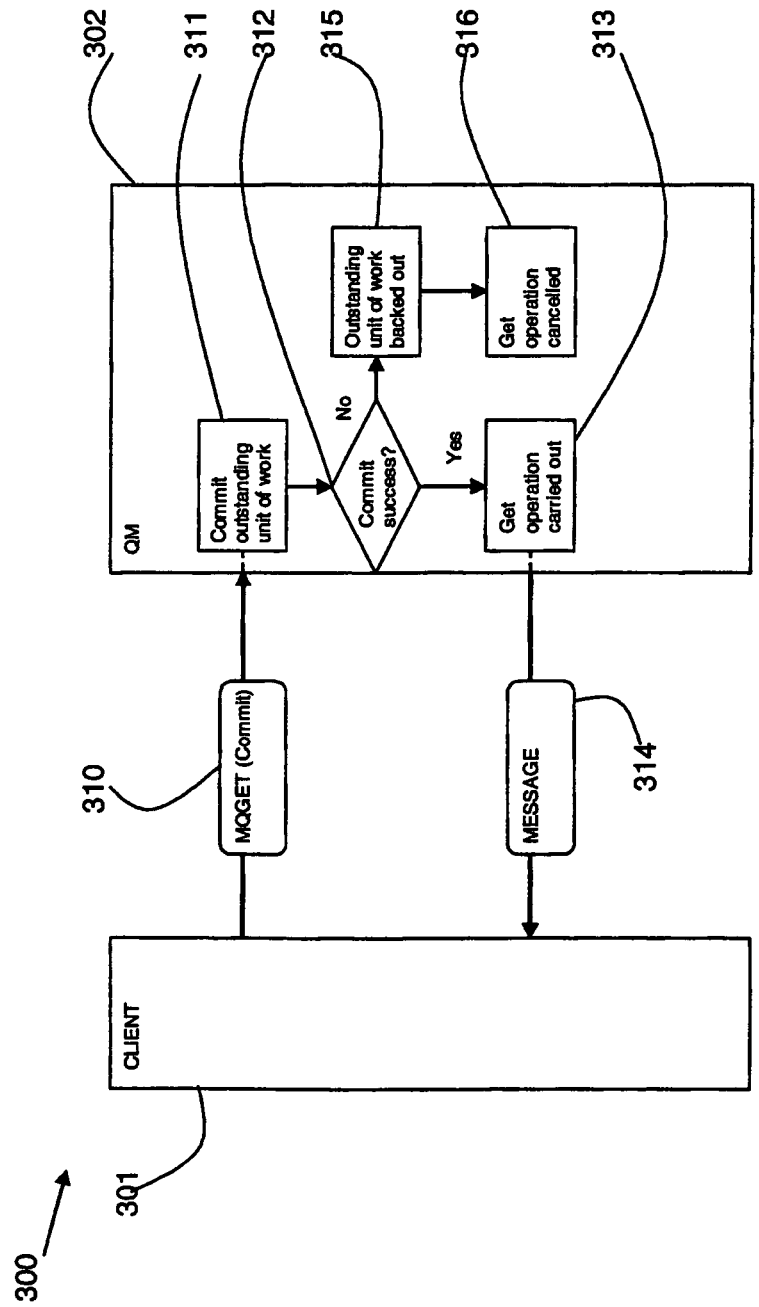
FIG. 3 is a flow diagram of a first embodiment of a messaging system in accordance with the present invention.

FIG. 3 is a flow diagram 300 showing the described combined commit and get request operation. A client application 301 sends a get operation request 310 with an option to commit any outstanding units of work to a queue manager 302. The queue manager 302 commits any outstanding units of work 311. It is determined if the commit is a success 312. If the commit is a success, the get operation is carried out 313 and a message 314 returned to the client application 301. If the commit fails, a commit failure outcome is returned to the client application 301, the outstanding unit of work is backed out 315, and the get operation is cancelled 316.

In a WebSphere MQ environment, the savings afforded depend on the cost of making an API call. The saving on a distributed client application would be greater than for a standard bound application which in turn would be greater than a fast bound application.

Flexible boundary systems have been proposed in which the application transfers responsibility to the queue manager or resource manager for batching more effectively.

Asynchronous commit is a process by which the application notifies the resource manager of the points at which a commit could occur. No response to confirm a commit is expected by the application. The resource manager can then choose the points when it writes to disk and the transactions grouped according to the resource manager which improves efficiency.

A significant number of applications depend upon the atomicity offered by transactions but see each transaction as an isolated request and so are not dependant upon one transaction completing before another transaction is started. By not waiting for the outcome to be known, then the committing application typically avoids waiting for a log force and so can proceed to service further requests in parallel with the ongoing commit.

When an asynchronous commit request is received then the transaction is disassociated from the current connection. The transaction is then added to a set of asynchronous transactions awaiting commit. The set of outstanding asynchronous transactions can be merged into one big transaction which then allows multiple updates to the same queue within different logical transactions to be performed under the same lock and allows a single log force to commit multiple user transactions. The scheduling of the actual commit processing becomes the queue manager's responsibility.

An asynchronous commit option is supported on a commit request indicating that the calling application wishes to initiate commit processing, but does not want to hear the outcome of the unit of work.

Figure 4:
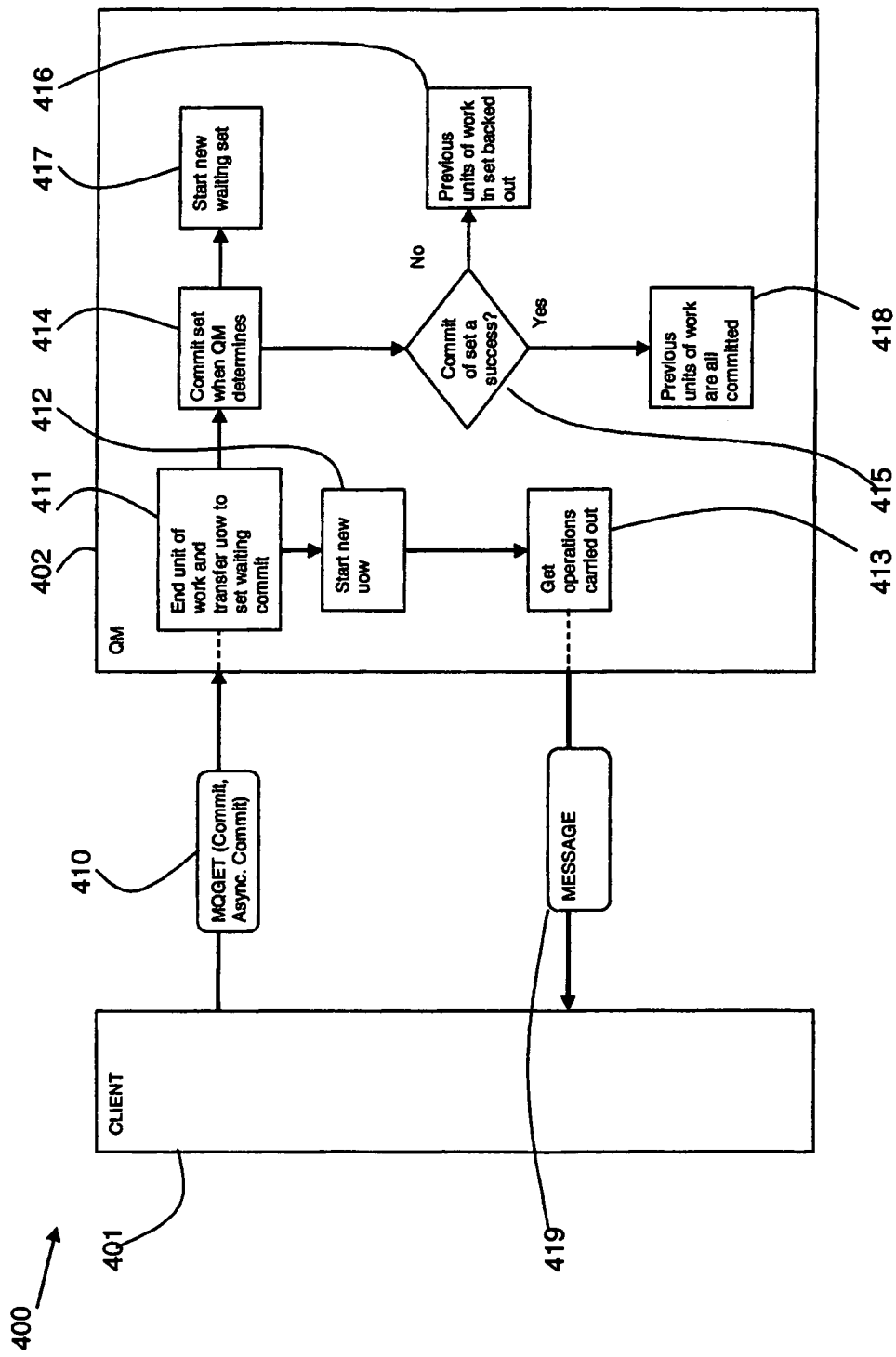
FIG. 4 is flow diagram of a second embodiment of a messaging system in accordance with the present invention.

FIG. 4 is a flow diagram 400 showing the described combined get and asynchronous commit request operation. A client application 401 sends a get operation request 410 to a queue manager 402 with an option of "asynchronous commit" to commit any outstanding units of work.

The queue manager 402 ends the unit of work and transfers the unit of work to a set of units of work waiting for commit 411. The set of waiting units of work is committed 414 as determined by the queue manager and a new waiting set is started 417. If a commit of the set 415 is a success, the units of work in the set are all committed 418. If the commit of the set is not a success, all the units of work in the set must be backed out 416.

Meanwhile, in parallel a new unit of work is started 412 and the get operation is carried out 413 and a message 419 is returned to the client application 401.

"Commit if you like" is a process similar to asynchronous commit but in which the queue manager chooses whether to commit or carry on based on a parameters determined by the queue manager. For example, the queue manager may choose when to commit based on the immediate availability of a suitable message to meet the request, the size of the current unit of work, how full the log is, the number of other applications with outstanding units of work, etc. The queue manager is provided with the information that there is a boundary and the queue manager then makes the choice of when to commit.

This is useful if used with a get with wait option {MQGET+MQGMO_WAIT} as it may be some time before the next get occurs and the commit is left hanging.

With the combined commit option, a combined get request and commit if you like {MQGET+MQGMO_COMMIT+MQGMO_COMMITIF_YOU_LIKE} can be used. This is more complicated as the size of the unit of work may be evaluated to decide if it should be committed immediately. A suitable message may also be searched for and then committed if one is not immediately available.

Figure 5:
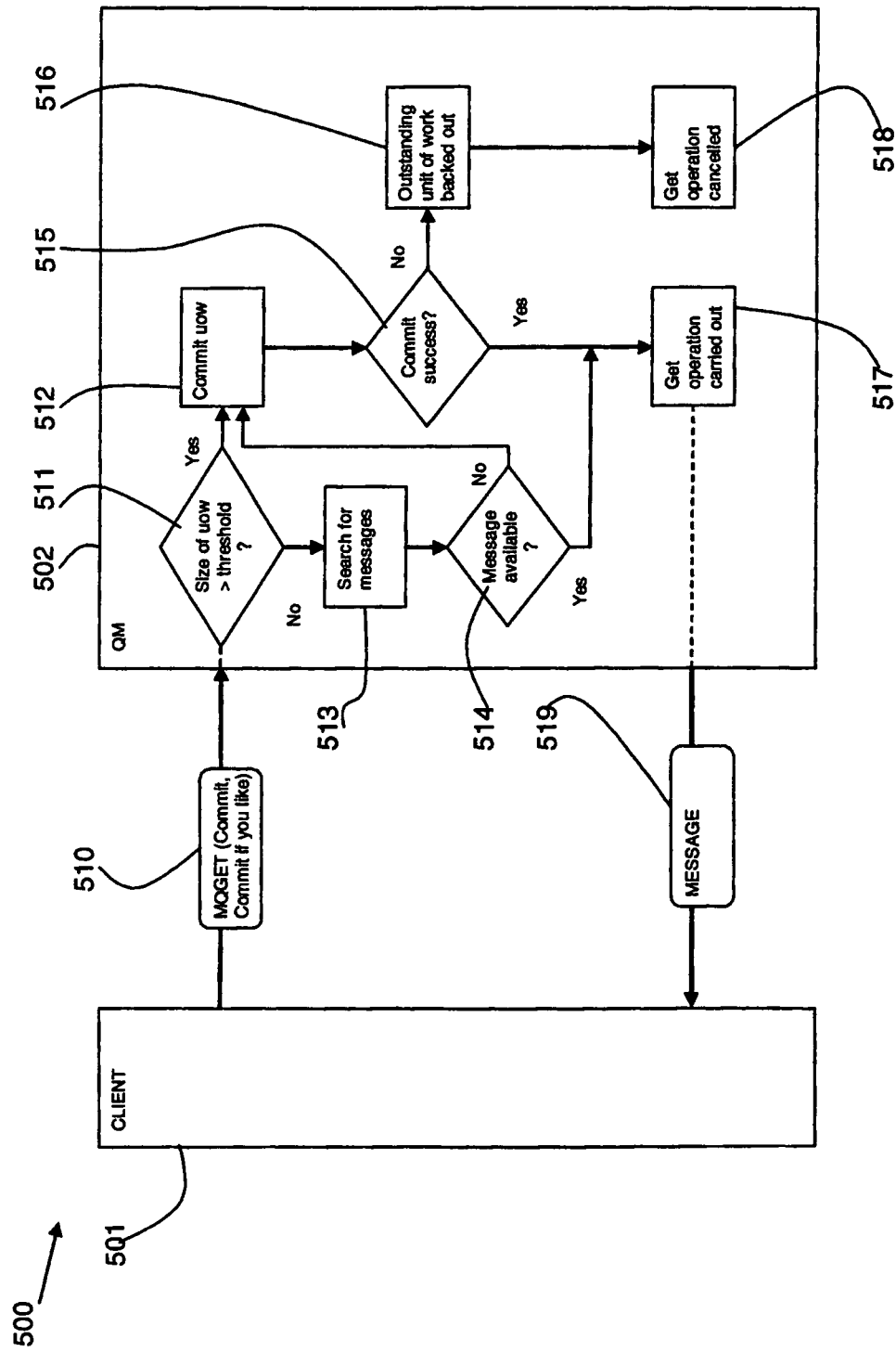
FIG. 5 is flow diagram of a third embodiment of a messaging system in accordance with the present invention.

FIG. 5 is a flow diagram 500 showing an example of the described combined get and commit if you like request operation. A client application 501 sends a get operation request 510 with an option to "commit if you like" any outstanding units of work to a queue manager 502.

The queue manager 502 determines 511 is the size of the unit of work is greater than a threshold commit size. If so, the unit of work is committed 512. If not, a search 513 is made for available messages. It is determined if a message is available 514. If no message is available, the unit of work is committed 512. If a message is available, the get operation is carried out 517 and the message 519 is returned to the client application 501.

If the unit of work is committed 512, it is determined if the commit is a success 515. If the commit is a success, the get operation is carried out 517 and a message 519 returned to the client application 501. If the commit fails, the outstanding unit of work is backed out 516 and the get operation is cancelled 518.

In the "commit if you like" process, the application delegates, within constraints, the decision on batch size/boundary to the resource manager. With a conventional get/operate/put/commit loop, the resource manager decision on each commit must be made with limited knowledge of the future, for example, what the next application call will be, when the next message will arrive, etc. By combining the commit/get operations, the resource manager can make a better informed decision.

The addition of the combined commit and subsequent operation request to flexible boundary systems such as asynchronous commit and commit if you like processes enables the resource manager to see both calls together and the resource manager is enabled to make a better decision on when to commit.

The present invention is typically implemented as a computer program product, comprising a set of program instructions for controlling a computer or similar device. These instructions can be supplied preloaded into a system or recorded on a storage medium such as a CD-ROM, or made available for downloading over a network such as the Internet or a mobile telephone network.

Improvements and modifications can be made to the foregoing without departing from the scope of the present invention.

The invention claimed is:

1. A computer-implemented method of committing the operations of a synchronized transaction by one or more applications on a resource manager, comprising:
   receiving, within a single combined request, a request for an operation and a request to commit any outstanding synchronized transaction;
   committing the outstanding transaction; and
   processing the requested operation separately from the committing the outstanding transaction;
   wherein the committing transfers the synchronized transaction to await committing with other transactions; and
   wherein the resource manager determines when to commit the transaction based on the number of applications with outstanding transactions in process.

2. The method of claim 1, wherein the requested operation is processed in a new transaction.

3. The method of claim 1, wherein
   upon the committing not being successful, the requested operation is not processed.

4. The method of claim 1, wherein
   the request to commit indicates a transaction boundary to the resource manager and transfers the responsibility of when to commit the transaction to the resource manager.

5. A computer-readable tangible medium having stored therein instructions, which, when executed by a computer system, cause the computer system to perform operations comprising:
   receiving, within a single combined request, a request for an operation and a request to commit any outstanding synchronized transaction;
   committing the outstanding synchronized transaction; and
   processing the requested operation upon determining the requested operation separately from the committing the outstanding transaction;
   wherein the committing transfers the synchronized transaction to await committing with other transactions;
   wherein the resource manager determines when to commit the transaction based on the number of applications with outstanding transactions in process.

6. The computer-readable tangible medium of claim 5, wherein the requested operation is processed in a new transaction.

7. The computer-readable tangible medium of claim 5, wherein
   upon the committing not being successful, the requested operation is not processed.

8. The computer-readable tangible medium of claim 5, wherein
   the request to commit indicates a transaction boundary to the resource manager and transfers the responsibility of when to commit the transaction to the resource manager.

* * * * *